(12) United States Patent
Palandri et al.

(10) Patent No.: US 11,370,259 B2
(45) Date of Patent: Jun. 28, 2022

(54) BEARING EYE FOR A LEAF SPRING AND LEAF SPRING HAVING A BEARING EYE

(71) Applicant: Ford Global Technologies, LLC, Dearborn, MI (US)

(72) Inventors: Jacopo Palandri, Aachen (DE); Rainer Souschek, Aachen (DE); Ralf Hintzen, Aachen (DE); Alberto Girelli Consolaro, Aachen (DE); Friedrich Peter Wolf-Monheim, Aachen (DE); Bjoern Reff, Cologne (DE); Thomas Gerhards, Niederzier (DE); Paul Zandbergen, Wurselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/104,093

(22) Filed: Nov. 25, 2020

(65) Prior Publication Data
US 2021/0155064 A1 May 27, 2021

(30) Foreign Application Priority Data
Nov. 25, 2019 (DE) .......................... 102019131736.3

(51) Int. Cl.
*B60G 11/44* (2006.01)
*B60G 11/18* (2006.01)
*B60G 17/02* (2006.01)

(52) U.S. Cl.
CPC ............ *B60G 11/44* (2013.01); *B60G 11/187* (2013.01); *B60G 17/023* (2013.01);
(Continued)

(58) Field of Classification Search
CPC ......... B60G 11/04; B60G 11/10; B60G 11/12; B60G 11/44; B60G 11/187; B60G 17/023;
(Continued)

(56) References Cited

U.S. PATENT DOCUMENTS 1,945,369 A * 1/1934 Harris .................... B60G 11/12
267/269
9,969,229 B2 * 5/2018 Soles ..................... B60G 11/04
(Continued)

FOREIGN PATENT DOCUMENTS

DE 102012017892 A1 * 3/2014 ............ F16F 1/3863
EP 1354731 B1 4/2008
(Continued)

*Primary Examiner* — James A English
*Assistant Examiner* — Scott F. Underwood
(74) *Attorney, Agent, or Firm* — Burr & Forman LLP

(57) ABSTRACT

A bearing eye for a leaf spring for sprung support of a vehicle component on a vehicle body of a vehicle may include a through opening and a torsion spring therein, and a first catch. The bearing eye may provide pivotable mounting of the leaf spring on the vehicle body. The torsion spring is twistable relative to the bearing eye and connectable non-rotatably to the vehicle body. The first catch may project radially inwardly into the through opening, and the torsion spring has a second catch that projects radially outwardly into the through opening. The first and second catches may form a locking engagement which, depending on a degree of relative twisting between the bearing eye and the torsion spring, stops the relative twisting.

19 Claims, 8 Drawing Sheets

Figure 1A:
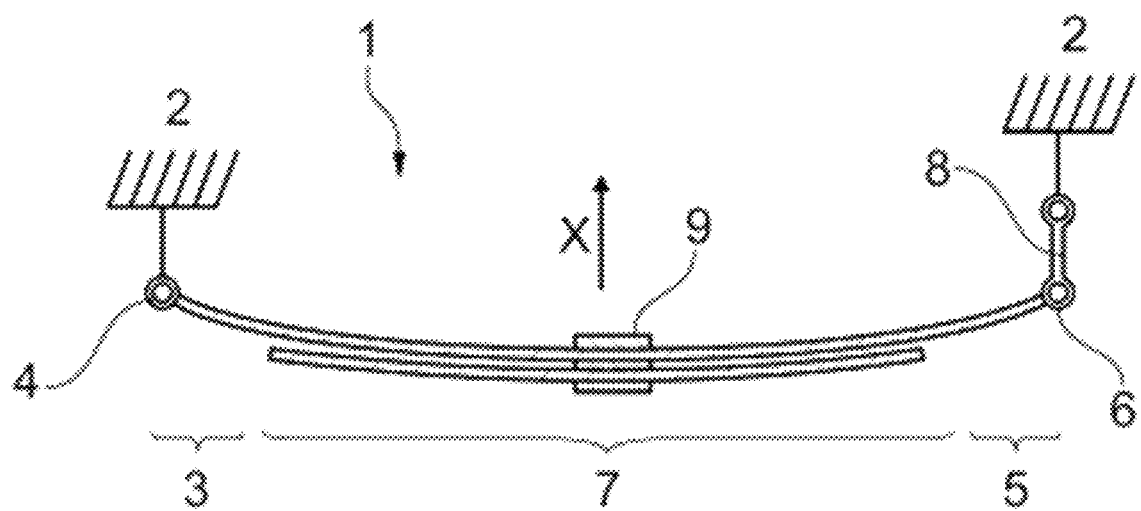
Figure 1A:
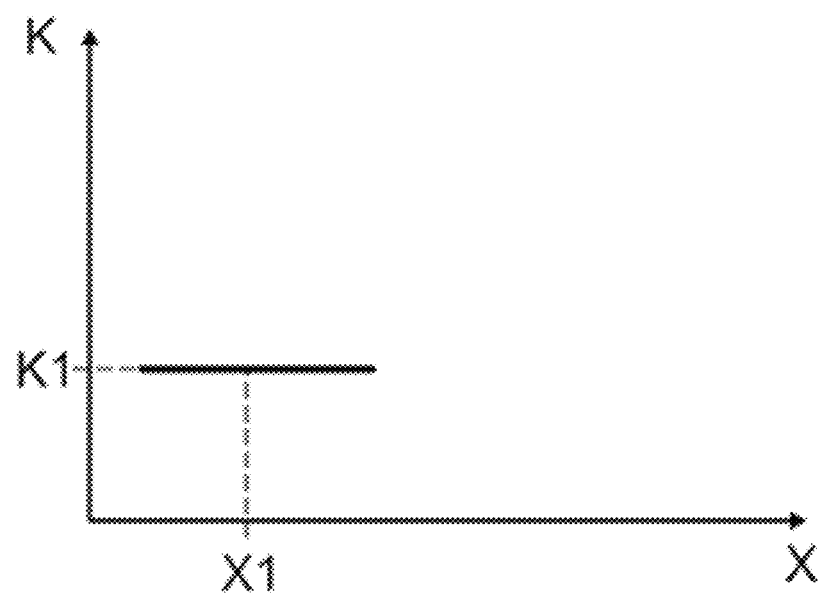

(52) U.S. Cl.
CPC .. *B60G 2202/114* (2013.01); *B60G 2202/136* (2013.01); *B60G 2204/121* (2013.01); *B60G 2204/122* (2013.01); *B60G 2206/017* (2013.01)

(58) Field of Classification Search
CPC ........ B60G 2202/112; B60G 2202/114; B60G 2202/136; B60G 2204/121; B60G 2204/122; B60G 2204/45; B60G 2206/017; B60G 7/04; F16F 1/26; F16F 1/3686; F16F 1/3828; F16F 1/3821
See application file for complete search history.

(56) References Cited

U.S. PATENT DOCUMENTS

| | | | | |
|---|---|---|---|---|
| 2001/0013676 A1* | 8/2001 | Reast | ..................... | B60G 11/42 267/47 |
| 2006/0255556 A1* | 11/2006 | Reast | ................... | B60G 17/023 280/124.17 |
| 2010/0127444 A1* | 5/2010 | Glass | ..................... | B60G 11/12 267/264 |
| 2017/0305225 A1* | 10/2017 | Soles | ..................... | B60G 11/04 |

FOREIGN PATENT DOCUMENTS

| | | | | | |
|---|---|---|---|---|---|
| FR | 2608972 | A1 | * | 7/1988 | .............. F16F 1/376 |
| GB | 937027 | A | | 9/1963 | |
| GB | 2019529 | A | * | 10/1979 | ................ F16C 3/02 |
| KR | 100369037 | B1 | | 1/2003 | |
| KR | 20180032228 | A | | 3/2018 | |
| KR | 101219333 | B1 | | 1/2019 | |
| RU | 2653650 | C1 | * | 5/2018 | ................ F16C 3/02 |

* cited by examiner

BEARING EYE FOR A LEAF SPRING AND LEAF SPRING HAVING A BEARING EYE

TECHNICAL FIELD

Example embodiments generally relate to a bearing eye for a leaf spring and, more particularly, relate to a bearing eye for a leaf spring for a sprung support of a vehicle component (e.g., a wheel carrier on a vehicle such as a motor vehicle or vehicle body).

BACKGROUND

Leaf springs for the sprung support of a wheel carrier on a vehicle are widely known. Any device which establishes the mechanical connection between a vehicle wheel, held rotatably by the wheel carrier, and the wheel suspension or body of the vehicle may be understood to be a wheel carrier. Leaf springs of this kind are used particularly on commercial vehicles, e.g., relatively small and relatively large goods vehicles. Usually, the leaf springs are attached to the motor vehicle in a manner aligned in such a way that the longitudinal extent of the springs is substantially parallel to a longitudinal direction of the motor vehicle.

It is also a matter of common knowledge to mount leaf springs pivotably on the vehicle body via a bearing eye provided on the leaf springs. In this regard, for example, U.S. Patent Application Publication No. 2012/0211931 A1 describes a composite leaf spring with bearing eyes formed integrally at the ends of the leaf spring. The bearing eyes each have a through opening, by means of which the end sections of the leaf spring can be attached pivotably to a vehicle body of a motor vehicle.

U.S. Pat. No. 6,428,025 has furthermore disclosed a multi-leaf leaf spring having a bearing eye formed integrally on an end section of the leaf spring and having a through opening, on the inner circumference of which serrations are formed. The bearing eye is pivotably mounted by means of a bearing pin held rotatably on a vehicle body, wherein the bearing pin has on the outer circumference thereof serrations which are in engagement with the serrations of the bearing eye for conjoint rotation therewith as soon as the bearing pin is inserted through the bearing eye. The rotary movement of the bearing pin is limited by a stop firmly connected to the vehicle body, with the result that, in the case of a slight spring movement of the leaf spring relative to the vehicle body, the bearing eye pivots freely with the bearing pin. As soon as the free rotary movement of the bearing pin has been stopped by the stop, the bearing pin exerts a torque on the bearing eye via the serrations. This is intended to counteract a rolling movement of a vehicle (corresponding to an excessive spring movement of the leaf spring).

KR 101219333 B1 discloses a leaf spring of a vehicle which is mounted pivotably via a bearing eye having a through opening on a shackle connected to a vehicle body. A freewheel clutch is arranged in the bearing eye. In a rotation angle range of the bearing eye corresponding to a normal spring movement of the leaf spring relative to the vehicle body, the clutch freewheels, that is to say it produces no torque on the bearing eye. Only in the case of an excessive spring movement of the leaf spring (corresponding to excessive twisting of the bearing eye) does the freewheel clutch enter a locked state, in which a further rotary movement of the bearing eye is blocked. This is intended to prevent the leaf spring from bottoming out, i.e. striking the vehicle body.

U.S. Pat. Nos. 5,007,660 and 6,019,384 each disclose multi-leaf leaf springs having bearing eyes formed on the ends, wherein one bearing eye is held pivotably on a first end of a shackle. The second end of the shackle is held pivotably, with the interposition of a torsion spring unit, on a vehicle body of a motor vehicle. The spring force produced in the case of a twisting of the second shackle end relative to the torsion spring unit held non-rotatably on the vehicle body is produced by a rubber-elastic bush which, on the one hand, is held non-rotatably on the torsion spring unit and, on the other hand, is connected non-rotatably to the second shackle end. The relative twisting is limited by a stop in order to prevent overloading of the rubber bush.

A multi-leaf leaf spring having bearing eyes, each with a through opening, attached to the ends is described in GB 937 027 A. The bearing eyes are each mounted pivotably on a bearing pin connected to a vehicle body of a vehicle. Fitted between the bearing pin of square cross section and the bearing eye surrounding the bearing pin, which is likewise of square design, is a plurality of rubber rollers, which are elastically deformed in the case of a relative twisting between the bearing pin and the bearing eye in order in this way to achieve a progressive spring action of the leaf spring.

KR 100369037 B1 furthermore shows a multi-leaf leaf spring having bearing eyes formed at the ends, through the opening in which a bearing pin connected to a vehicle body is brought up thereto to provide pivotable mounting of the bearing eyes. The bearing eye is supported by a conical spring on each of its two sides (i.e., in the direction of the pivoting axis defined by the bearing pin) in order to counteract forces acting in the direction of the pivoting axis.

EP 1 354 731 B1 discloses an adjustable torsion spring unit for a wheel suspension of a vehicle, which can be used among other things also to preload a leaf spring by inserting the torsion spring unit between a fixing bearing of the leaf spring and a vehicle body of the vehicle.

KR 20180032228 A furthermore shows a multi-leaf leaf spring having bearing eyes formed on the ends, wherein one of the bearing eyes is held pivotably by means of a first bearing bush on a vehicle body, and the other bearing eye is held pivotably by means of a second bearing bush on a shackle mounted so as to be pivotable relative to the vehicle body. Each bearing bush is accommodated in a through opening of the corresponding bearing eye for conjoint rotation therewith. A torsion spring is fixed on an inner circumferential surface of the bearing bush for conjoint rotation therewith by engagement of a first free, radially outward-curved end of the torsion spring in a corresponding opening on the inner circumferential surface of the bearing bush. A second free end of the torsion spring is curved radially inwards. A single stop plate, which is fixed non-rotatably on the vehicle body and on the shackle and the broad side of which extends substantially over the entire inside diameter of the torsion spring, is passed through the bearing bush. Depending on the angular position of the torsion spring relative to the stop plate, the second free end of the torsion spring comes to rest against the broad side of the stop plate. Rotary movements of the bearing eyes caused by spring movements of the leaf spring lead to corresponding rotary movements of the bearing bushes accommodated in the bearing eyes for conjoint rotation therewith and consequently to the same rotary movements of the torsion springs. The rotary movement of the torsion spring is stopped by contact between the second free end of the torsion spring and the stop plate. Further technical details on the design of the rotary mounting of the bearing bush around the stop plate are not disclosed.

BRIEF SUMMARY OF SOME EXAMPLES

Some example embodiments may provide a bearing eye for a leaf spring for sprung support of a vehicle component on a vehicle body of a vehicle. The bearing eye may include a through opening and a torsion spring therein, and a first catch. The bearing eye may provide pivotable mounting of the leaf spring on the vehicle body. The torsion spring is twistable relative to the bearing eye and connectable non-rotatably to the vehicle body. The first catch may project radially inwardly into the through opening, and the torsion spring has a second catch that projects radially outwardly into the through opening. The first and second catches may form a locking engagement which, depending on a degree of relative twisting between the bearing eye and the torsion spring, stops the relative twisting.

In accordance with an example embodiment, a leaf spring for sprung support of a vehicle component on a vehicle body of a vehicle may be provided. The leaf spring may include a first end section having a first bearing for operably coupling the leaf spring to the vehicle body, a second end section situated diametrically opposite to the first end section and having a second bearing for operably coupling the leaf spring to another portion of the vehicle body, and a spring-action section extending between the first end section and the second end section. One or both of the first bearing and the second bearing may include a bearing eye that includes a through opening and a torsion spring therein, and a first catch. The bearing eye may provide pivotable mounting of the leaf spring on the vehicle body. The torsion spring may be twistable relative to the bearing eye and connectable non-rotatably to the vehicle body. The first catch may project radially inwardly into the through opening, and the torsion spring may have a second catch that projects radially outwards into the through opening. The first and second catches may form a locking engagement which, depending on a degree of relative twisting between the bearing eye and the torsion spring, stops the relative twisting.

BRIEF DESCRIPTION OF THE SEVERAL VIEWS OF THE DRAWING(S)

Figure 1B:
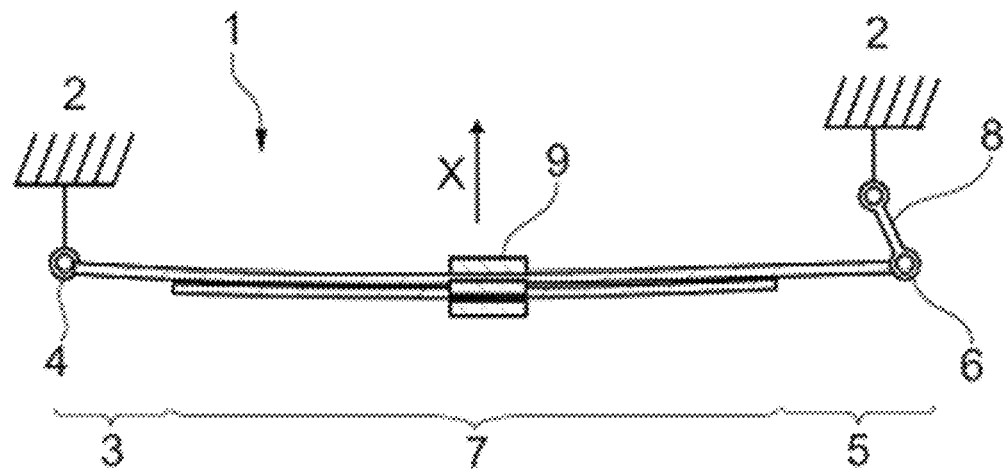
Figure 1B:
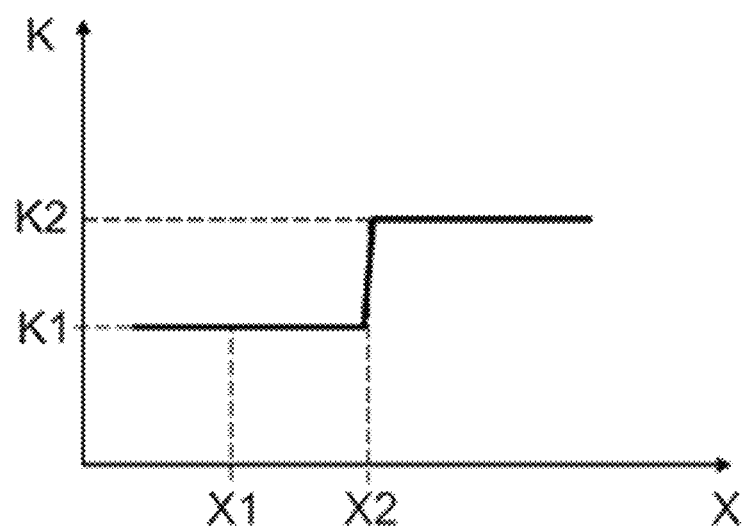
Figure 2:
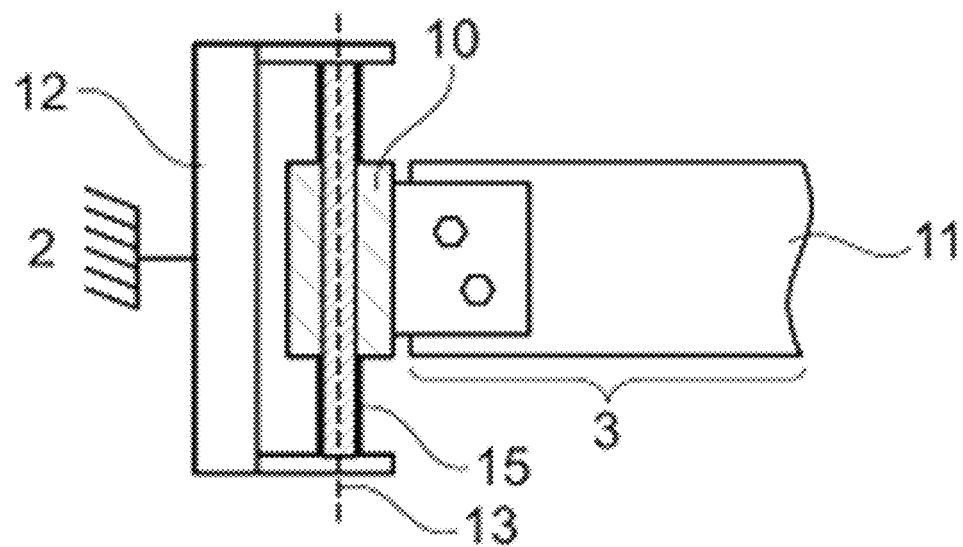
Figure 3A:
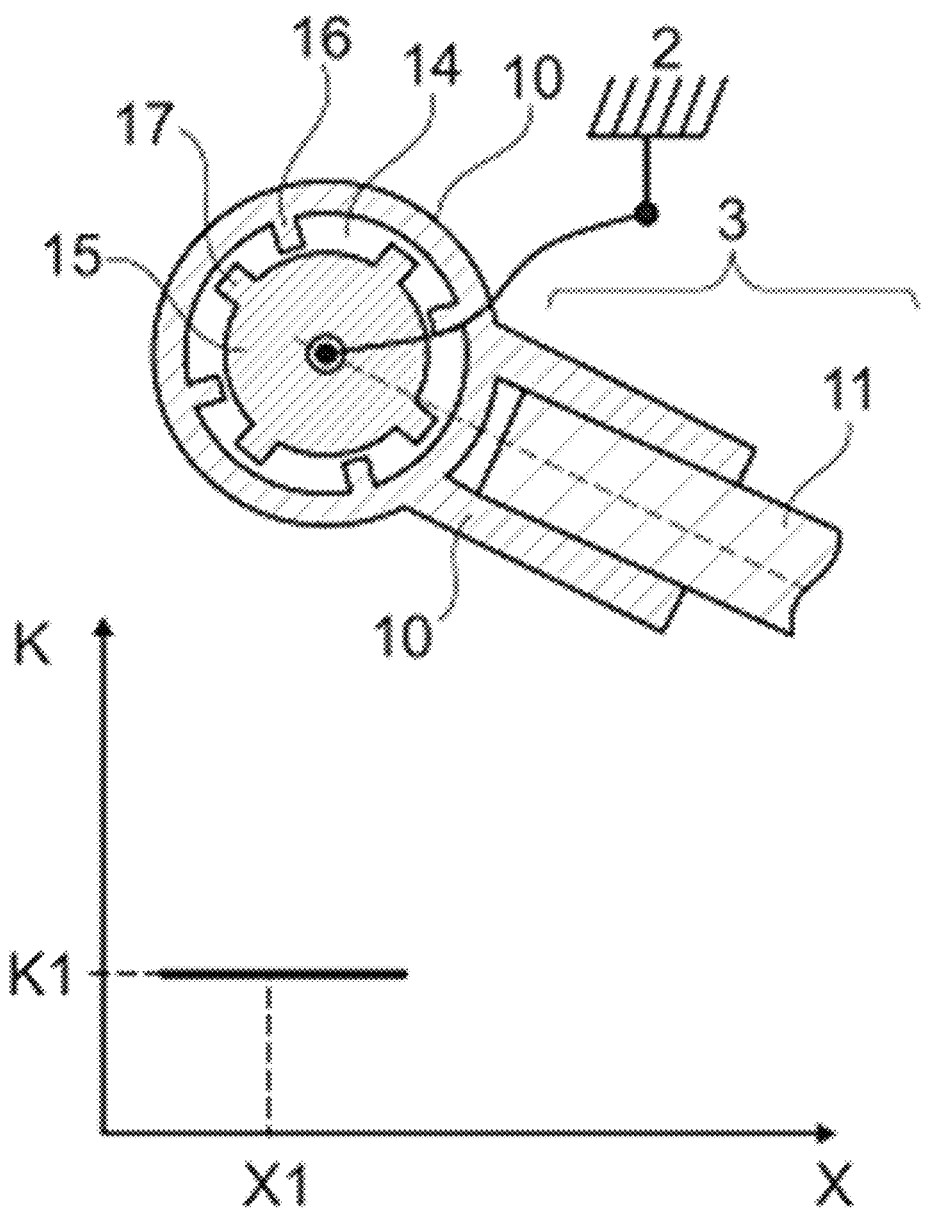
Figure 3B:
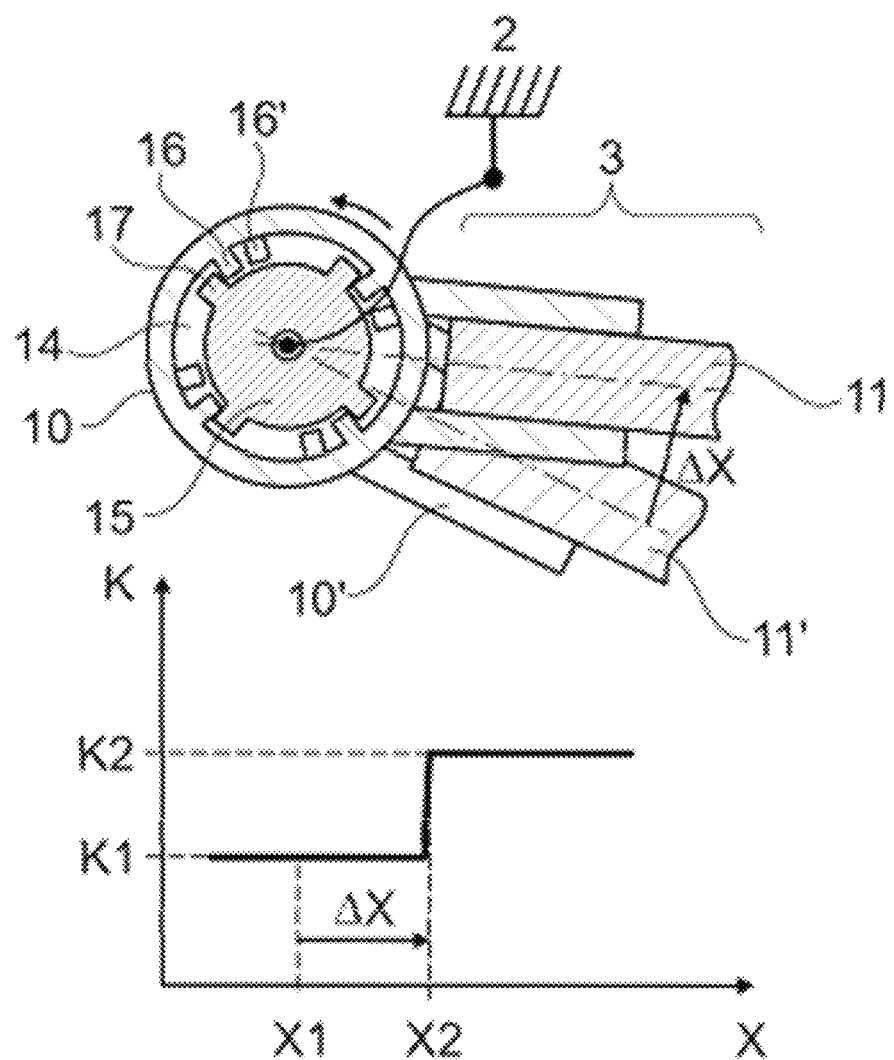
Figure 4A:
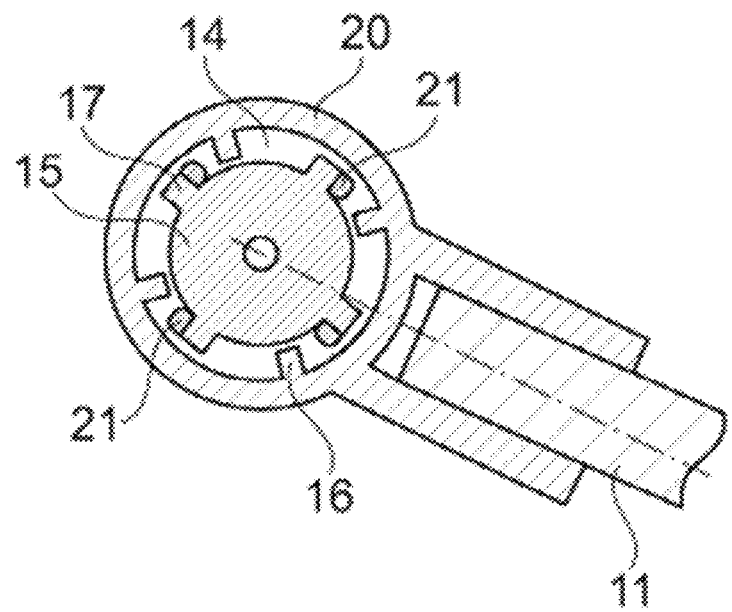
Figure 4A:
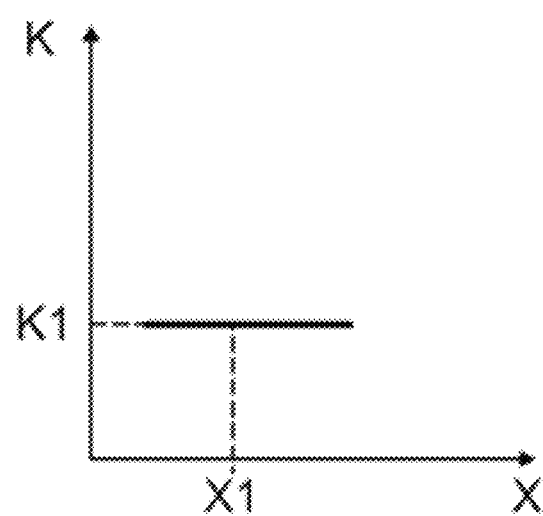
Figure 4B:
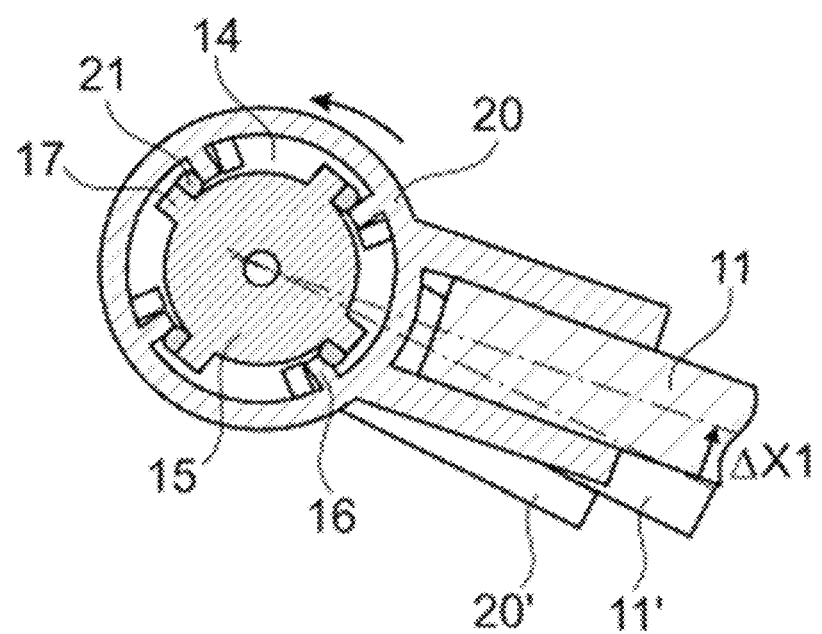
Figure 4B:
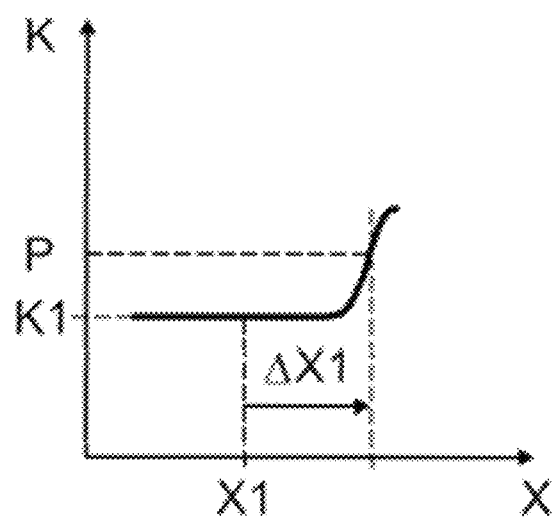
Figure 4C:
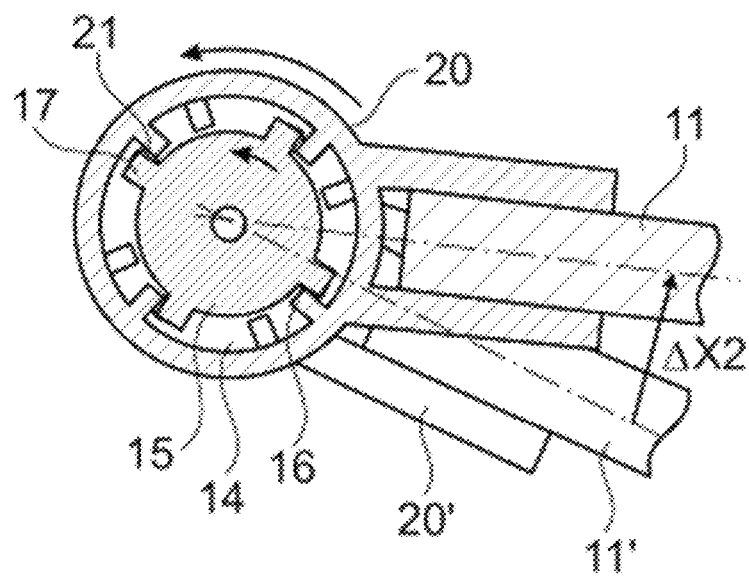
Figure 4C:
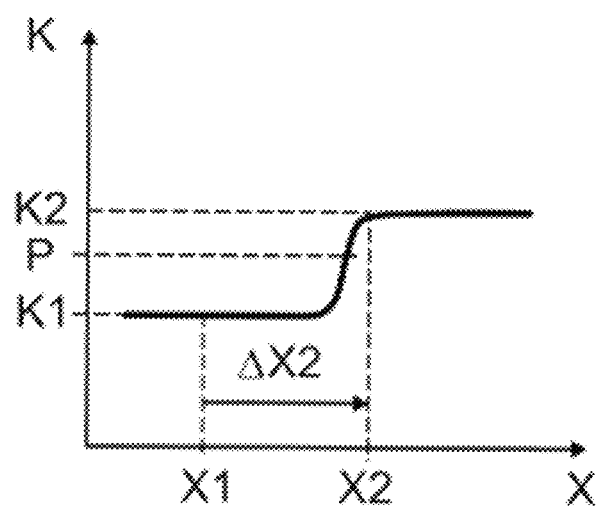

Having thus described the invention in general terms, reference will now be made to the accompanying drawings, which are not necessarily drawn to scale, and wherein:

FIG. 1, which is defined by FIGS. 1A and 1B, illustrates a side view of an illustrative embodiment of a leaf spring in accordance with the prior art in two different operating states;

FIG. 2 illustrates a plan view of an illustrative embodiment of a bearing eye as well as a plan view of a section of an illustrative embodiment of a leaf spring which contains the bearing eye in accordance with an example embodiment;

FIG. 3, which is defined by FIGS. 3A and 3B, illustrates a side view of the bearing eye and of the leaf spring section from FIG. 2 in two different operating states in accordance with an example embodiment; and FIG. 4, which is defined by FIGS. 4A, 4B and 4C, illustrates a side view of a bearing eye as well as a side view of a section of a leaf spring which contains the bearing eye, in three different operating states, in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

Although the known leaf springs described above already offer certain advantages, there is nevertheless a need for an even better and simpler capacity for adaptation to different loading and/or driving states of a vehicle on which the leaf spring is used. Accordingly, some example embodiments may provide an improved bearing eye for a leaf spring as well as an improved leaf spring having a bearing eye which are both of compact construction and have a low weight and have a high durability and long life simultaneously combined with low production costs. Moreover, example embodiments may make it possible to adapt a desired spring stiffness or spring rate of the leaf spring by simple measures to particular uses in order to be able to provide improved vehicle properties in terms of driving dynamics.

In this regard, some example embodiments may provide a bearing eye for a leaf spring for the sprung support of a vehicle component, e.g., a wheel carrier, on a vehicle body or a subframe of a vehicle, in particular a motor vehicle. The bearing eye may include a through opening and provide pivotable mounting of the leaf spring on the vehicle body. According to some embodiments, it is envisaged that a torsion spring, which can be twisted (in its entirety) relative to the bearing eye and can be connected non-rotatably to the vehicle body. That is to say, after the mounting of the bearing eye on the vehicle body, the torsion spring may be connected non-rotatably to the vehicle body and arranged in the through opening. Furthermore, the bearing eye may have at least one first catch, which projects radially inwardly into the through opening, and the torsion spring may have at least one second catch, which projects radially outwardly into the through opening. The first and second catches may form a locking engagement which, depending on the degree of relative twisting between the bearing eye and the torsion spring, stops the relative twisting.

The locking engagement formed by the first and second catches can be brought about both frictionally, e.g., by means of clamping noses that make frictional contact with one another, clamping humps, clamping wedges and the like, and/or positively, e.g., by means of latching noses that come to rest against one another. In other words, the ability to twist the bearing eye relative to the torsion spring allows pivot mounting of the bearing eye around the torsion spring as long as there is no locking engagement of the first and second catches. Here, the torsion spring advantageously forms a (substantially purely passive) guide element for the bearing eye. At the same time, in the presence of locking engagement, the total spring rate of a leaf spring fitted with this bearing eye is modified, in particular increased (in accordance with a progressive spring characteristic), as compared with a spring rate of the leaf spring alone since, with continued twisting of the bearing eye, the torsion spring is twisted along with it to the same degree owing to the locking engagement and is thus activated, i.e., is compelled to produce a spring force that counteracts the twisting of the bearing eye.

In an example embodiment, by virtue of the arrangement and configuration described herein, the torsion spring thus simultaneously combines two functions, allowing a particularly compact and reduced-weight construction. Since the bearing eye according to some example embodiments provides an additional spring force by means of the active torsion spring, which is effective during locking engagement, in the case of locking engagement between the first and second catches, the leaf spring can have a smaller number of spring leaves than usual, for example, this being additionally conducive to a compact and weight saving construction of the overall leaf spring assembly. Merely by simple adaptation of torsion spring properties that affect the spring rate, a desired overall spring stiffness can be selectively achieved for predetermined loading and/or driving states of the vehicle to which a leaf spring is attached via the bearing eye according to the invention. A high overall spring stiffness with a long service life can be achieved, despite a reduced number of spring leaves and/or spring leaves of thinner design.

In various example embodiments, the torsion spring can be produced from different materials, e.g., from metal, a composite material and the like, or from a combination thereof. According to an example embodiment, the torsion spring may be held by or in the through opening. This means that the bearing eye and the torsion spring may form a structural unit, and therefore the bearing eye can be mounted on the vehicle in a unit together with the torsion spring, making assembly significantly easier and reducing the number of assembly steps required.

Another example embodiment may provide that at least three first catches may be arranged in a manner distributed uniformly along an inner circumference of the bearing eye or of the through opening thereof, and at least three second catches may be arranged in a manner distributed uniformly along an outer circumference of the torsion spring. It is thereby advantageously possible, inter alia, to additionally stabilize the pivot mounting of the bearing eye on the torsion spring, both in respect of tilting and of displacement transversely to the pivoting axis defined by the longitudinal axis of the torsion spring, since, during the relative twisting, the first catches can slide substantially along the outer circumference of the torsion spring and the second catches can slide along the inner circumference of the through opening of the bearing eye.

In an example embodiment, the first and second catches may each be designed as latching noses projecting into the through opening, and the locking engagement may be formed by positive contact between the first catch and the second catch, without however being exclusively restricted thereto.

In an example embodiment, an elastically deformable intermediate element may be fitted between the contact surfaces, forming the locking engagement, of the first catch and of the second catch. The elastic intermediate element may be produced from polymer materials, elastomers, e.g., rubber, and the like, for example. By means of the elastic intermediate element, a more gentle transition from a first spring rate (e.g. spring constant of the leaf spring alone) to a second spring rate (e.g. total spring constant comprising the spring constant of the leaf spring plus the spring constant of the torsion spring) can be achieved.

The spring rate transition can be adapted selectively through the choice of specific material properties of the intermediate element, e.g., hardness, elasticity etc., and through the geometry thereof, e.g. length, width, thickness, (cross-sectional) shape and the like. It is thereby possible to further improve the properties of a vehicle in respect of driving dynamics during the operation thereof, especially in the transitional region between different spring rates.

In an example embodiment, the elastic intermediate element may be attached firmly either to the first catch or to the second catch, i.e., can be held by the respective catch, ensuring positioning of the intermediate element relative to the contact surfaces of the first and second catches which is always defined and reliable.

In an example embodiment, the bearing eye may be a component which is separate from the leaf spring and can be fixed on the leaf spring. The bearing eye can be fixed on the leaf spring by positive engagement, for example, by means of screws, bolts, pins, rivets and the like, and/or by material bonding, e.g., by means of welding, adhesive bonding and the like. The separate formation of the bearing eye allows simple and flexible adaptation of the spring characteristics of a leaf spring according to the vehicle type and intended use without the need to modify the leaf spring structurally for this purpose. It is sufficient merely to provide the leaf spring with the corresponding bearing eye.

In an example embodiment, a leaf spring for the sprung support of a vehicle component, e.g., a wheel carrier, on a vehicle body of a vehicle (e.g., a motor vehicle such as a commercial vehicle) may be provided. The leaf spring may have a first end section with a first bearing means for its first fixing on the vehicle body, a second end section, situated diametrically opposite therefrom, with a second bearing means for its second fixing on the vehicle body, and a spring-action section, which extends between the two end sections, wherein at least one of the bearing means is designed as a bearing eye according to any of the preceding embodiments for the provision of pivotable mounting on the vehicle body.

In an example embodiment, in respect of the definition of terms relating to the leaf spring and of the effects and advantages of features relating to the leaf spring, attention is drawn to the disclosures of analogous definitions, effects and advantages herein, in their entirety, in respect of the bearing eye according to the invention. In other words, the intention is that disclosures herein relating to the bearing eye according to example embodiments can likewise be used, mutatis mutandis, to define the leaf spring according to example embodiments, unless expressly excluded. Likewise, the intention is that disclosures herein relating to the bearing eye according to example embodiments can be used, mutatis mutandis, to define the leaf spring according to example embodiments, unless expressly excluded. To this extent, there is no need to repeat explanations of features that are analogous, or their effects and advantages, in respect of the bearing eye according to example embodiments disclosed herein and in respect of the leaf spring according to example embodiments disclosed herein, for the sake of a more concise description, although without any restriction.

In an example embodiment, the bearing eye may be a component that is separate from the leaf spring and is fixed on the respective end section (e.g., positively and/or by material bonding). Example embodiments may enable provision of a leaf spring having only a single spring leaf to provide a particularly compact and light construction.

In an example embodiment, the leaf spring may, in each case, have a bearing eye according to any of the embodiments described above at each of its two end sections. The two bearing eyes can be of substantially identical construction or design, particularly in respect of their spring properties (e.g. spring rate). However, if desired they can also be of different designs in this respect in order to be able to provide different force effects exerted by the bearing eye on the leaf spring at the two bearing points of the leaf spring on the vehicle body.

In the top half of the image, FIG. 1, which is defined by FIGS. 1A and 1B, schematically illustrates a side view of an illustrative example of a conventional multi-leaf (in the present case two-leaf) leaf spring 1 in two different operating states (i.e., FIG. 1A illustrates a first operating state and FIG. 1B illustrates a second operating state). Each of FIGS. 1A and 1B also includes a curve diagram correspondingly associated with the first and second operating states of FIGS. 1A and 1B, respectively, in which the abscissas in each case represent the spring travel X of the leaf spring 1 and the ordinates in each case represent the spring rate K of the leaf spring 1 as a function of the spring travel X.

The leaf spring 1 is used for the sprung support of a vehicle component (not illustrated) on a symbolically illustrated vehicle body 2 of a vehicle (likewise not illustrated). The leaf spring 1 has a first end section 3 having a first bearing means 4, e.g., a (rubber-metal) bearing bush, for its first fixing on the vehicle body 2, a second end section 5, situated diametrically opposite said first end section, having a second bearing means 6, e.g., likewise a (rubber-metal) bearing bush, for its second fixing on the vehicle body 2, and a spring-action section 7, which extends between the two end sections 3, 5. It can be seen from FIG. 1 that the second end section 5 is not connected directly to the vehicle body 2 but via a shackle 8, of a kind which is well known, mounted pivotably on the vehicle body 2.

The vehicle component, e.g., a wheel carrier, which is not shown in FIG. 1, is held on the leaf spring 1 in a central region of the leaf spring 1 via a clamping and holding means 9.

The leaf spring 1 may be formed of two components (or leaves) including a main leaf of the leaf spring (shown on top in FIGS. 1A and 1B) and an auxiliary spring (shown below the main leaf in FIGS. 1A and 1B). The auxiliary spring may only exert a spring action when the spring travel of the leaf spring 1 exceeds a minimum amount X2, as illustrated in FIG. 1B. The spring force, which is then additionally exerted by the auxiliary leaf due to contact with the main leaf, is added to the spring force brought about by the main leaf alone, that is to say, in the case illustrated here, the spring rates of the main leaf and of the auxiliary leaf are added to give the spring rate sum K2 from the increased spring travel X2 and above. In this way, a progressive (i.e., nonlinear) spring action of the overall leaf spring 1 can be achieved, wherein the change between the nominal spring rate K1 at a nominal spring travel X1 (e.g. from low loading to slight loading of the vehicle) and the increased spring rate K2 above an excessive spring travel X2 (e.g. when the vehicle is heavily laden) takes place relatively abruptly and stepwise, as can clearly be seen from the corresponding curve diagram.

FIG. 2 illustrates schematically, a plan view of an illustrative embodiment of a bearing eye 10 according to an example embodiment and a plan view of a section (in the present case a first end section 3) of an illustrative embodiment of a leaf spring 11 according to an example embodiment containing the bearing eye 10. It should be understood that the leaf spring 11 according to example embodiments can likewise have an identical or at least similar bearing eye to the bearing eye 10 shown in FIG. 2 on its second end section 5 (not shown in FIG. 2), but without being restricted thereto.

Like the leaf spring 1 from FIG. 1, the leaf spring 11 according to example embodiments likewise serves for the sprung support of a vehicle component, e.g., a wheel carrier (not illustrated), on a vehicle body 2 of a vehicle (likewise not illustrated specifically). The bearing eye 10 forms a pivotable mounting for the leaf spring 11 on the vehicle body 2 (in the present case via a holding clamp 12 firmly connected to the vehicle body 2) around a pivoting axis 13.

As can furthermore be seen from FIG. 2, the bearing eye 10 in the example embodiment illustrated here is a component that is separate from the leaf spring 11 and which can be fixed or is fixed on the leaf spring 11, e.g., by means of screw fastening, without being restricted thereto. The bearing eye 10 may also be formed integrally on the end section 3 of the leaf spring 11.

FIG. 3, which is defined by FIGS. 3A and 3B, illustrates schematically a side view of the bearing eye 10 and of the leaf spring section 3 of the leaf spring 11 from FIG. 2 in two different operating states (e.g., a first operating state in FIG. 3A and a second operating state in FIG. 3B). Once again, the curve diagrams, already known from FIG. 1, for the spring rate K as a function of the spring travel X are illustrated in connection with each of FIGS. 3A and 3B, respectively.

It can clearly be seen in FIG. 3 that the bearing eye 10 has a through opening 14. It is furthermore shown that a torsion spring 15 that can be twisted relative to the bearing eye 10 is arranged in the through opening 14. The torsion spring 15 may be connected non-rotatably to the vehicle body 2 or, in the present case, held non-rotatably on the holding clamp 12 connected to the vehicle body 2. As can furthermore be seen from FIG. 3, the bearing eye 10 has at least one first catch 16, which projects radially inwards into the through opening 14, and the torsion spring 15 has at least one second catch 17, which projects radially outwards into the through opening 14, said catches forming a locking engagement, as shown in the view of FIG. 3B, which, depending on the degree of relative twisting between the bearing eye 10 and the torsion spring 15, stops the relative twisting.

In the example embodiments shown, a total of four first catches 16 are arranged in a manner distributed uniformly along an inner circumference of the through opening 14, and a total of four second catches 17 are arranged in a manner distributed uniformly along an outer circumference of the torsion spring 15, without, however, being restricted to the number of precisely four first and second catches 16, 17 shown. In other words, example embodiments may employ either more than four first catches 16 and second catches 17, or fewer than four first catches 16 and second catches 17.

In the example embodiment illustrated, the first and second catches 16, 17 are furthermore each designed as latching noses, without being restricted thereto. The locking engagement is formed by positive contact between the first catches 16 and the second catches 17, as can be seen in FIG. 3B, in which the initial state of the bearing eye 10, which is illustrated in FIG. 3A, and a current state of the bearing eye 10, in which the bearing eye is twisted anticlockwise relative to the torsion spring 15 and in which the first catches 16 come to rest against the second catches 17, are illustrated. The respective reference signs followed by an apostrophe 10', 11', 16' denote the corresponding component in the initial state thereof, as illustrated in FIG. 3A.

In the initial or nominal state illustrated in FIG. 3A, the first and second catches 16, 17 are spaced apart. They are therefore not in positive contact with one another. Accordingly, the bearing eye 10 can twist substantially freely relative to the torsion spring 15. In this state, the torsion spring 15 can be regarded simply as a passive guiding element for the bearing eye 10.

With increasing loading of the vehicle, a vertical spring movement X (as discussed above in reference to FIG. 1) of the leaf spring 11 leads to a rotary movement of the bearing eye 10, as indicated in FIG. 3B. Once the spring travel X2 has been reached after a spring movement ΔX (in accordance with the state illustrated in FIG. 3B), the first and second catches 16, 17 form the positive engagement by resting against one another. From this moment onwards, the torsion spring 15 is active for spring movements X greater than X2, i.e., it then produces a spring force counteracting the rotation of the bearing eye 10 owing to its own twisting initiated by the further twisting of the bearing eye 10. The relatively sudden rise in torque (change in the total spring rate from K1 to K2) is clearly visible in the curve diagram below FIG. 3B.

The point at which the locking engagement starts can be adapted by specifying the spacing between the first and second catches 16, 17 in the nominal position illustrated in FIG. 3A. The spring rate of the torsion spring 15 can be modified in the desired manner by adapting the material and/or geometric properties thereof.

FIG. 4 illustrates schematically a side view of another illustrative embodiment of a bearing eye 20 according to an example embodiment and a side view of an end section 3, having the bearing eye 20, of an example embodiment of a leaf spring 11 in three different operating states. In this regard, a first operating state is shown in FIG. 4A, a second operating state is shown in FIG. 4B and a third operating state is shown in FIG. 4C. Once again, the curve diagrams for the spring rate K as a function of the spring travel X which are already known from the descriptions above in reference to FIG. 1 are illustrated below respective ones of the views shown in FIGS. 4A, 4B and 4C, respectively.

In the case of the bearing eye 20, the significant difference with respect to the bearing eye 10 illustrated in FIG. 3 is that an elastically deformable intermediate element 21 is in each case fitted between contact surfaces of the first catches 16 and the second catches 17 that form the locking engagement, in the present example, the intermediate element 21 is held or fixed on the second catches 17. However, the intermediate element 21 is not restricted to this particular placement and could alternatively be located and held in other ways (e.g., via being held or fixed on the first catches 16).

In the nominal or initial position of the spring travel X1 illustrated in FIG. 4A, the first and second catches 16, 17 are spaced apart to such an extent that the elastic intermediate element 21 is not in contact with both the first and the respective second catch 16, 17. That is to say that, in this state, the elastic intermediate element 21 is not compressed. In this state, the torsion spring 15 is furthermore passive and does not produce any spring force. Only the spring rate K1 of the leaf spring 11 is effective in this situation.

If the spring travel X1+ΔX1 in the illustration in FIG. 4B is reached (twisting of the bearing eye 20 anticlockwise by an angle corresponding to the spring travel ΔX1), each intermediate element 21 may be compressed and elastically deformed by the respective first and second catches 16, 17, which move towards one another. In this state, the torsion spring 15 continues to be substantially passive and as yet produces substantially no additional spring force. The total spring rate K nevertheless rises gradually (initially gently) in the progression range P indicated in the associated curve diagram, owing to the elastic deformation of the intermediate elements 21 (as shown in FIG. 4B).

If the state illustrated in FIG. 4C is reached by further anticlockwise twisting of the bearing eye 20 (in accordance with a spring travel ΔX2 travelled from the nominal position X1), the elastic intermediate elements 21 may reach a fully compressed state, with the result that, from there on, the positive engagement becomes effective between the first and second catches 16, 17. The total spring rate K increases to its maximum K2. From this point, the torsion spring 15 is transferred together with the bearing eye 20 into its active state by the onset of twisting, i.e., it produces a spring force counteracting the anticlockwise rotary movement of the bearing eye 20 or a counter torque, as shown in FIG. 4C.

Example embodiments of the bearing eye 20, which include the elastically deformable intermediate elements 21, allow a gradual change between spring rates K1 and K2. The material and/or geometric properties of the intermediate elements 21, e.g., hardness or elasticity and the like, can be selectively chosen to achieve a transition between spring rates K1 and K2, which is as rapid or gradual as desired. The leaf spring 11 can be designed as a single-leaf leaf spring, i.e., it has just a single spring leaf, or may include multiple leaves.

The bearing eye according to example embodiments disclosed herein and the leaf spring according to example embodiments are not restricted to the respective embodiments specifically disclosed herein, but also include other embodiments with the same effect that result from technically expedient further combinations of the features of the bearing eye or leaf spring which are described herein. In particular, the features and combinations of features which are mentioned hereinabove in the general description and the description of the figures and/or those which are shown only in the figures can be used not only in the respective combinations indicated explicitly herein but also in other combinations or in isolation without exceeding the scope of example embodiments. In some cases, the bearing eye according to example embodiments may be used on a leaf spring for the sprung support of a vehicle component, e.g., a wheel carrier, on a vehicle body of a vehicle, in particular a motor vehicle, such as conventional or electric-motor-driven commercial vehicles. Here, the longitudinal direction of the leaf spring arranged on the vehicle preferably corresponds substantially to the longitudinal direction of the vehicle.

Accordingly, a leaf spring for sprung support of a vehicle component on a vehicle body of a vehicle may be provided. The leaf spring may include a first end section having a first bearing for operably coupling the leaf spring to the vehicle body, a second end section situated diametrically opposite to the first end section and having a second bearing for operably coupling the leaf spring to another portion of the vehicle body, and a spring-action section extending between the first end section and the second end section. One or both of the first bearing and the second bearing may include a bearing eye that includes a through opening and a torsion spring therein, and a first catch. The bearing eye may provide pivotable mounting of the leaf spring on the vehicle body. The torsion spring may be twistable relative to the bearing eye and connectable non-rotatably to the vehicle body. The first catch may project radially inwardly into the through opening, and the torsion spring may have a second catch that projects radially outwards into the through opening. The first and second catches may form a locking engagement which, depending on a degree of relative twisting between the bearing eye and the torsion spring, stops the relative twisting.

The leaf spring of some embodiments may include additional features, modifications, augmentations and/or the like to achieve further objectives or enhance performance of the leaf spring. The additional features, modifications, augmentations and/or the like may be added in any combination with each other. Below is a list of various additional features, modifications, and augmentations that can each be added individually or in any combination with each other. For example, the torsion spring is secured in the through opening to be non-rotatable relative to the vehicle body. In some cases, at least three first catches may be arranged in a manner distributed uniformly along an inner circumference of the through opening, and at least three second catches may be arranged in a manner distributed uniformly along an outer circumference of the torsion spring. In an example embodiment, the first and second catches may each be designed as latching noses, and the locking engagement may be formed by positive contact between the first catch and the second catch. In some examples, an elastically deformable intermediate element may be disposed between a surface of the first catch that contacts a surface of the second catch when the positive contact is achieved between the first and second catches. In an example embodiment, the elastically deformable intermediate element may include a portion of the locking engagement. In some cases, the elastically deformable element may be attached firmly to the first catch. In an example embodiment, the elastically deformable element may be attached firmly to the second catch. In some cases, the bearing eye may be a component which is separate from the leaf spring and can be fixed on the leaf spring. In an example embodiment, the bearing eye may be a separate component from the leaf spring and is fixed on the first end section or the second end section. In some cases, the leaf spring may only have a single leaf.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A bearing eye for a leaf spring for sprung support of a vehicle component on a vehicle body of a vehicle, the bearing eye comprising:
    a through opening and a torsion spring therein; and
    a first catch,
    wherein the bearing eye provides pivotable mounting of the leaf spring on the vehicle body,
    wherein the torsion spring is twistable relative to the bearing eye and connectable non-rotatably to the vehicle body,
    wherein the first catch projects radially inwardly into the through opening, and the torsion spring has a second catch that projects radially outwards into the through opening,
    wherein the first and second catches are spaced apart by a spaced apart distance in a nominal state and, after the first catch moves the spaced apart distance relative to the second catch from the nominal state, the first catch and the second catch form a locking engagement which, depending on a degree of relative twisting between the bearing eye and the torsion spring, applies a spring force of the torsion spring counteracting the relative twisting.

2. The bearing eye according to claim 1, wherein at least three first catches are arranged in a manner distributed uniformly along an inner circumference of the through opening, and at least three second catches are arranged in a manner distributed uniformly along an outer circumference of the torsion spring.

3. The bearing eye according to claim 1, wherein the first and second catches are each designed as latching noses, and the locking engagement is formed by positive contact between the first catch and the second catch.

4. The bearing eye according to claim 1, wherein the bearing eye is a component which is separate from the leaf spring and can be fixed on the leaf spring.

5. The bearing eye according to claim 1, wherein the first catch and the second catch rotate together while in the locking engagement in response to the relative twisting exceeding the spring force of the torsion spring.

6. A bearing eye for a leaf spring for sprung support of a vehicle component on a vehicle body of a vehicle, the bearing eye comprising:
    a through opening and a torsion spring therein; and
    a first catch,
    wherein the bearing eye provides pivotable mounting of the leaf spring on the vehicle body,
    wherein the torsion spring is twistable relative to the bearing eye and connectable non-rotatably to the vehicle body,
    wherein the first catch projects radially inwardly into the through opening, and the torsion spring has a second catch that projects radially outwards into the through opening, and
    wherein the first and second catches form a locking engagement which, depending on a degree of relative twisting between the bearing eye and the torsion spring, stops the relative twisting
    wherein the first and second catches are each designed as latching noses, and the locking engagement is formed by positive contact between the first catch and the second catch;
    wherein an elastically deformable intermediate element is disposed on a surface of the first catch that contacts a surface of the second catch when the positive contact is achieved between the first and second catches.

7. The bearing eye according to claim 6, wherein the elastically deformable intermediate element comprises a portion of the locking engagement.

8. The bearing eye according to claim 6, wherein the elastically deformable element is attached firmly to the first catch.

9. The bearing eye according to claim 6, wherein the elastically deformable element is attached firmly to the second catch.

10. A leaf spring for sprung support of a vehicle component on a vehicle body of a vehicle, the leaf spring comprising:
    a first end section having a first bearing for operably coupling the leaf spring to the vehicle body;
    a second end section situated diametrically opposite to the first end section and having a second bearing for operably coupling the leaf spring to another portion of the vehicle body; and
    a spring-action section extending between the first end section and the second end section,
    wherein one or both of the first bearing and the second bearing comprises a bearing eye, the bearing eye comprising:
    a through opening and a torsion spring therein; and
    a first catch,
    wherein the bearing eye provides pivotable mounting of the leaf spring on the vehicle body,
    wherein the torsion spring is twistable relative to the bearing eye and connectable non-rotatably to the vehicle body,
    wherein the first catch projects radially inwardly into the through opening, and the torsion spring has a second catch that projects radially outwards into the through opening, and
    wherein the first and second catches are spaced apart by a spaced apart distance in a nominal state and, after the first catch moves the spaced apart distance relative to the second catch from the nominal state, the first catch and the second catch form a locking engagement which, depending on a degree of relative twisting between the bearing eye and the torsion spring, the torsion spring applies a spring force counteracting the relative twisting.

11. The leaf spring according to claim 10, wherein at least three first catches are arranged in a manner distributed uniformly along an inner circumference of the through opening, and at least three second catches are arranged in a manner distributed uniformly along an outer circumference of the torsion spring.

12. The leaf spring according to claim 10, wherein the first and second catches are each designed as latching noses, and the locking engagement is formed by positive contact between the first catch and the second catch.

13. The leaf spring according to claim 12, wherein an elastically deformable intermediate element is disposed on a surface of the first catch that contacts a surface of the second catch when the positive contact is achieved between the first and second catches.

14. The leaf spring according to claim 13, wherein the elastically deformable intermediate element comprises a portion of the locking engagement.

15. The leaf spring according to claim 13, wherein the elastically deformable element is attached firmly to the first catch.

16. The leaf spring according to claim 13, wherein the elastically deformable element is attached firmly to the second catch.

17. The leaf spring according to claim 10, wherein the bearing eye is a component which is separate from the leaf spring and can be fixed on the leaf spring.

18. The leaf spring according to claim 10, wherein the bearing eye is a separate component from the leaf spring and is fixed on the first end section or the second end section.

19. The leaf spring according to claim 10, wherein the leaf spring has only a single leaf.

* * * * *